(12) United States Patent  (10) Patent No.: US 7,712,276 B2
Gilbert et al.  (45) Date of Patent: May 11, 2010

(54) MOISTURE DIVERTING INSULATED SIDING PANEL

(75) Inventors: Thomas C. Gilbert, Clarklake, MI (US); Gregory F. Jacobs, Oreland, PA (US); David H. Beck, Jackson, MI (US)

(73) Assignee: Certainteed Corporation, Valley Forge, PA (US)

( * ) Notice: Subject to any disclaimer, the term of this patent is extended or adjusted under 35 U.S.C. 154(b) by 958 days.

(21) Appl. No.: 11/093,465

(22) Filed: Mar. 30, 2005

(65) Prior Publication Data

US 2006/0075712 A1 Apr. 13, 2006

Related U.S. Application Data

(63) Continuation-in-part of application No. 10/955,405, filed on Sep. 30, 2004, now abandoned.

(51) Int. Cl.
*E04C 1/00* (2006.01)
(52) U.S. Cl. .......................... 52/529; 52/533; 52/309.8; 52/302.3
(58) Field of Classification Search .................... 52/533, 52/534, 529, 530, 309.8, 302.1, 302.3, 539, 52/169.5
See application file for complete search history.

(56) References Cited

U.S. PATENT DOCUMENTS

| 1,447,567 | A |   | 3/1923  | Overbury |
|-----------|---|---|---------|----------|
| 1,495,070 | A |   | 5/1924  | Finley |
| 1,592,218 | A | * | 7/1926  | Motzko ..................... 52/302.3 |
| 1,732,403 | A |   | 10/1929 | Harris et al. |
| 1,787,163 | A |   | 12/1930 | New |
| 1,872,185 | A |   | 8/1932  | Reade |
| 1,959,960 | A |   | 5/1934  | Magrath |
| 2,089,005 | A |   | 8/1937  | Sherman et al. |
| 2,142,181 | A |   | 1/1939  | Croce |
| 2,149,741 | A |   | 3/1939  | Miles |
| 2,171,010 | A |   | 8/1939  | Schuetz et al. |
| 2,174,098 | A |   | 9/1939  | Stein |
| 2,187,203 | A |   | 1/1940  | Johnston |
| 2,192,933 | A | * | 3/1940  | Saborsky ................... 52/302.3 |
| 2,199,760 | A |   | 5/1940  | Schuetz |
| 2,206,042 | A |   | 7/1940  | Novak |
| 2,238,017 | A |   | 4/1941  | Duncan |
| 2,264,961 | A | * | 12/1941 | Ward ......................... 52/302.3 |
| 2,308,789 | A |   | 1/1943  | Stagg |
| 2,317,926 | A |   | 4/1943  | Lindahl |
| 2,560,521 | A |   | 7/1951  | Camp et al. |
| 2,633,441 | A |   | 3/1953  | Buttress |
| 2,954,302 | A |   | 9/1960  | Gorman, Jr. |

(Continued)

*Primary Examiner*—Richard E Chilcot, Jr.
*Assistant Examiner*—Brent W Herring
(74) *Attorney, Agent, or Firm*—Duane Morris LLP

(57) ABSTRACT

A siding panel product is provided comprising a first polymeric siding panel having a butt end and a top end, a front surface comprising a plurality of front faces defined between the top and butt ends and separated by at least one shoulder surface to define a stepped contour, and a rear surface. An insulation backing is coupled to the rear surface of the siding panel. The insulation backing comprises at least first and second insulation members coupled to the rear surface of said siding panel. The first insulation member has a bottom edge thereof coupled proximate to the stepped contour and the second insulation member has a top edge thereof coupled proximate to the stepped contour.

24 Claims, 8 Drawing Sheets

U.S. PATENT DOCUMENTS

| | | | | |
|---|---|---|---|---|
| 3,001,332 | A * | 9/1961 | Wilder | 52/302.1 |
| 3,004,483 | A * | 10/1961 | Prager et al. | 454/275 |
| 3,110,130 | A * | 11/1963 | Trachtenberg | 52/545 |
| 3,158,960 | A * | 12/1964 | Newton et al. | 52/302.1 |
| 3,159,943 | A * | 12/1964 | Sugar et al. | 52/278 |
| 3,185,297 | A | 5/1965 | Rutledge | |
| 3,284,980 | A | 11/1966 | Dinkel | |
| 3,289,371 | A | 12/1966 | Pearson et al. | |
| 3,304,678 | A * | 2/1967 | Morell | 52/302.3 |
| 3,308,586 | A * | 3/1967 | Olson | 52/99 |
| 3,391,037 | A | 7/1968 | McNulty | |
| 3,607,486 | A | 9/1971 | Jacks et al | |
| 3,608,261 | A | 9/1971 | French et al. | |
| 3,742,668 | A | 7/1973 | Oliver | |
| 3,766,003 | A | 10/1973 | Schuller et al. | |
| 3,830,687 | A | 8/1974 | Re et al. | |
| 3,868,300 | A | 2/1975 | Wheeler | |
| 3,887,410 | A | 6/1975 | Lindner | |
| 3,927,501 | A | 12/1975 | Allen et al. | |
| 3,929,947 | A | 12/1975 | Schwartz et al. | |
| 3,935,021 | A | 1/1976 | Greve et al. | |
| 3,941,632 | A | 3/1976 | Swedenberg et al. | |
| 3,944,698 | A | 3/1976 | Dierks et al. | |
| 3,947,398 | A | 3/1976 | Williams | |
| 3,993,822 | A | 11/1976 | Knauf et al. | |
| 3,998,021 | A * | 12/1976 | Lewis | 52/531 |
| 4,015,391 | A | 4/1977 | Epstein et al. | |
| 4,020,237 | A | 4/1977 | Von Hazmburg | |
| 4,033,802 | A * | 7/1977 | Culpepper et al. | 156/71 |
| 4,034,528 | A | 7/1977 | Sanders et al. | |
| 4,040,851 | A | 8/1977 | Ziegler | |
| 4,047,355 | A | 9/1977 | Knorr | |
| 4,065,333 | A | 12/1977 | Lawlis et al. | |
| 4,065,597 | A | 12/1977 | Gillespie | |
| 4,073,997 | A | 2/1978 | Richards et al. | |
| 4,081,939 | A * | 4/1978 | Culpepper et al. | 52/535 |
| 4,096,011 | A | 6/1978 | Sanders et al. | |
| 4,100,711 | A * | 7/1978 | Skuran | 52/489.2 |
| 4,112,174 | A | 9/1978 | Hannes et al. | |
| 4,128,699 | A | 12/1978 | Kole et al. | |
| 4,135,029 | A | 1/1979 | Pfeffer | |
| 4,148,781 | A | 4/1979 | Narukawa et al. | |
| 4,181,767 | A | 1/1980 | Steinau | |
| 4,187,130 | A | 2/1980 | Kautz | |
| 4,195,110 | A | 3/1980 | Dierks et al. | |
| 4,203,788 | A | 5/1980 | Clear | |
| 4,242,406 | A | 12/1980 | El Bouhnini et al. | |
| 4,263,365 | A | 4/1981 | Burgess et al. | |
| 4,265,064 | A * | 5/1981 | Parezo | 52/302.3 |
| 4,265,979 | A | 5/1981 | Baehr et al. | |
| 4,277,526 | A | 7/1981 | Jackson | |
| 4,288,959 | A | 9/1981 | Murdock | |
| 4,296,169 | A | 10/1981 | Shannon | |
| 4,303,722 | A | 12/1981 | Pilgrim | |
| 4,324,082 | A | 4/1982 | Rutkowski et al. | |
| 4,335,177 | A | 6/1982 | Takeuchi | |
| 4,344,804 | A | 8/1982 | Bijen et al. | |
| 4,344,910 | A | 8/1982 | Bijen | |
| 4,351,867 | A | 9/1982 | Mulvey et al. | |
| 4,361,616 | A | 11/1982 | Bomers | |
| 4,363,666 | A | 12/1982 | Johnson et al. | |
| 4,364,212 | A | 12/1982 | Pearson et al. | |
| 4,366,197 | A | 12/1982 | Hanlon et al. | |
| 4,378,405 | A | 3/1983 | Pilgrim | |
| 4,399,643 | A * | 8/1983 | Hafner | 52/530 |
| 4,403,006 | A | 9/1983 | Bruce et al. | |
| 4,428,775 | A | 1/1984 | Johnson et al. | |
| 4,437,274 | A | 3/1984 | Slocum et al. | |
| 4,468,909 | A | 9/1984 | Eaton | |
| 4,477,300 | A | 10/1984 | Pilgrim | |
| 4,504,533 | A | 3/1985 | Altenhofer et al. | |
| 4,506,060 | A | 3/1985 | White, Sr. et al. | |
| 4,506,486 | A * | 3/1985 | Culpepper et al. | 52/529 |
| 4,543,159 | A | 9/1985 | Johnson et al. | |
| 4,571,356 | A | 2/1986 | White, Sr. et al. | |
| 4,586,304 | A * | 5/1986 | Flamand | 52/309.8 |
| 4,637,860 | A | 1/1987 | Harper et al. | |
| 4,647,496 | A | 3/1987 | Lehnert et al. | |
| 4,664,707 | A | 5/1987 | Wilson et al. | |
| 4,681,802 | A | 7/1987 | Gaa et al. | |
| 4,704,048 | A * | 11/1987 | Ahlgrimm | 405/45 |
| 4,722,866 | A | 2/1988 | Wilson et al. | |
| 4,788,808 | A * | 12/1988 | Slocum | 52/521 |
| 4,810,569 | A | 3/1989 | Lehnert et al. | |
| 4,810,576 | A | 3/1989 | Gaa et al. | |
| 4,811,538 | A | 3/1989 | Lehnert et al. | |
| 4,864,788 | A | 9/1989 | Tippmann | |
| 5,148,645 | A | 9/1992 | Lehnert et al. | |
| 5,220,762 | A | 6/1993 | Lehnert et al. | |
| 5,319,900 | A | 6/1994 | Lehnert et al. | |
| 5,342,680 | A | 8/1994 | Randall | |
| 5,371,989 | A | 12/1994 | Lehnert et al. | |
| 5,397,631 | A | 3/1995 | Green et al. | |
| 5,401,588 | A | 3/1995 | Garvey et al. | |
| 5,433,048 | A | 7/1995 | Strasser | |
| 5,439,518 | A | 8/1995 | Francis et al. | |
| 5,501,056 | A | 3/1996 | Hannah et al. | |
| 5,502,940 | A * | 4/1996 | Fifield | 52/309.12 |
| 5,598,677 | A * | 2/1997 | Rehm, III | 52/407.1 |
| 5,601,888 | A | 2/1997 | Fowler | |
| 5,614,307 | A | 3/1997 | Andersen et al. | |
| 5,636,489 | A * | 6/1997 | Leverrier et al. | 52/540 |
| 5,644,880 | A | 7/1997 | Lehnert et al. | |
| 5,704,179 | A | 1/1998 | Lehnert et al. | |
| 5,718,785 | A | 2/1998 | Randall | |
| 5,772,846 | A | 6/1998 | Jaffee | |
| 5,791,109 | A | 8/1998 | Lehnert et al. | |
| 5,799,446 | A | 9/1998 | Tamlyn | |
| 5,830,548 | A | 11/1998 | Andersen et al. | |
| 5,832,677 | A * | 11/1998 | Kurttila | 52/95 |
| 5,881,502 | A | 3/1999 | Tamlyn | |
| 5,897,108 | A | 4/1999 | Gordon et al. | |
| 5,906,364 | A | 5/1999 | Thompson et al. | |
| 5,945,182 | A | 8/1999 | Fowler et al. | |
| 5,960,598 | A | 10/1999 | Tamlyn | |
| 5,981,406 | A | 11/1999 | Randall | |
| 5,993,303 | A | 11/1999 | Fladgard et al. | |
| 6,018,924 | A | 2/2000 | Tamlyn | |
| 6,029,415 | A | 2/2000 | Culpepper et al. | |
| 6,029,966 | A | 2/2000 | Hertz et al. | |
| 6,195,952 | B1 | 3/2001 | Culpepper et al. | |
| 6,258,190 | B1 | 7/2001 | Sciarrino et al. | |
| 6,263,574 | B1 | 7/2001 | Lubker, II et al. | |
| 6,276,107 | B1 | 8/2001 | Waggoner et al. | |
| 6,293,534 | B1 | 9/2001 | Leban | |
| D448,865 | S * | 10/2001 | Manning | D25/141 |
| D450,138 | S | 11/2001 | Barber | |
| 6,321,500 | B1 | 11/2001 | Manning et al. | |
| 6,341,458 | B1 | 1/2002 | Burt | |
| 6,346,146 | B1 | 2/2002 | Duselis et al. | |
| 6,354,049 | B1 | 3/2002 | Bennett | |
| 6,358,585 | B1 | 3/2002 | Wolff | |
| 6,367,222 | B1 | 4/2002 | Timbrel et al. | |
| 6,418,610 | B2 * | 7/2002 | Lubker et al. | 29/525.01 |
| 6,434,890 | B1 * | 8/2002 | Konnerth | 52/79.1 |
| 6,506,248 | B1 | 1/2003 | Duselis et al. | |
| 6,510,667 | B1 | 1/2003 | Cottier et al. | |
| D471,292 | S | 3/2003 | Barber | |
| 6,526,718 | B2 | 3/2003 | Manning et al. | |
| 6,619,004 | B2 * | 9/2003 | Loper | 52/302.1 |
| 6,625,950 | B1 | 9/2003 | Shreiner et al. | |
| 6,684,597 | B1 | 2/2004 | Butcher | |
| 6,705,052 | B1 | 3/2004 | Larson | |
| 6,863,972 | B2 | 3/2005 | Burger et al. | |

| | | |
|---|---|---|
| 6,886,301 B2 | 5/2005 | Schilger |
| 7,040,067 B2 * | 5/2006 | Mowery et al. ............... 52/519 |
| D530,833 S * | 10/2006 | Robertson et al. .......... D25/121 |
| 7,188,454 B2 * | 3/2007 | Mowery et al. ............... 52/539 |
| 2002/0029537 A1 | 3/2002 | Manning et al. |
| 2002/0108333 A1 * | 8/2002 | Clayton .................... 52/302.1 |
| 2003/0029097 A1 | 2/2003 | Albracht |
| 2003/0056458 A1 | 3/2003 | Black et al. |
| 2004/0200171 A1 | 10/2004 | Schilger |
| 2004/0200183 A1 | 10/2004 | Schilger |
| 2005/0081468 A1 * | 4/2005 | Wilson et al. ................. 52/528 |
| 2006/0042183 A1 * | 3/2006 | Benes ....................... 52/741.1 |
| 2006/0053715 A1 * | 3/2006 | Mowery et al. ............. 52/309.8 |
| 2006/0068188 A1 | 3/2006 | Morse et al. |
| 2006/0272257 A1 * | 12/2006 | Hobbie ........................ 52/519 |
| 2007/0044402 A1 * | 3/2007 | Hess ......................... 52/302.1 |
| 2007/0212970 A1 * | 9/2007 | Rockwell et al. ........... 442/394 |

\* cited by examiner

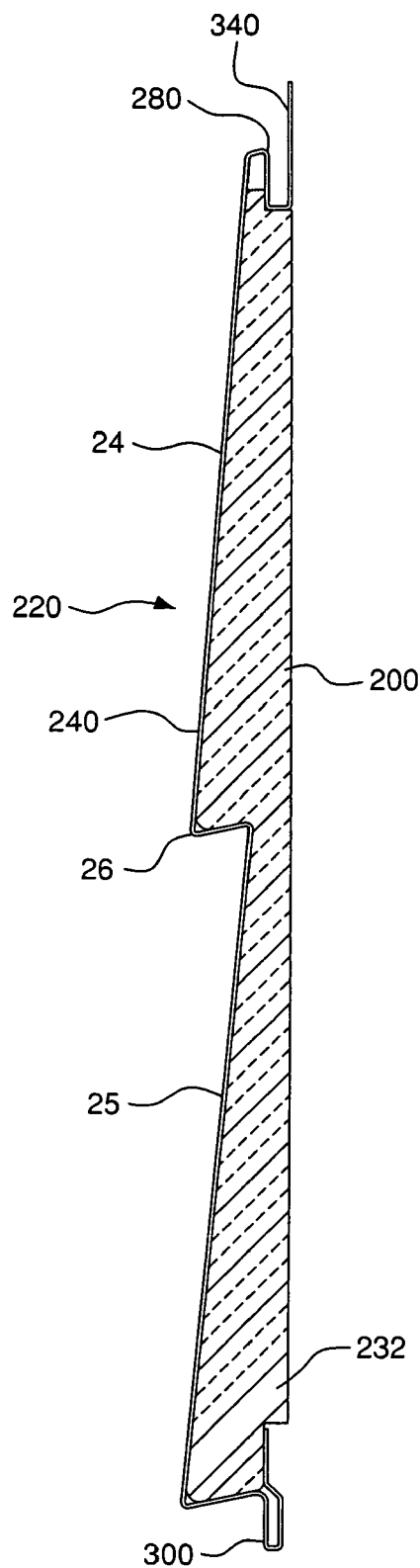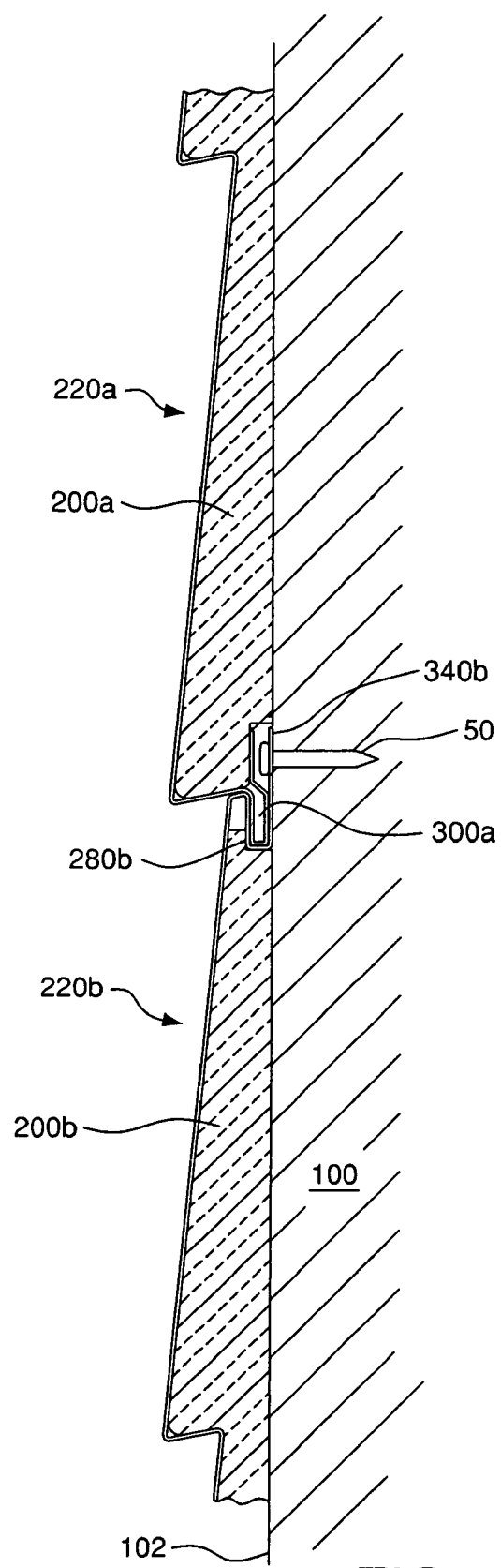
FIG. 4
FIG. 4A

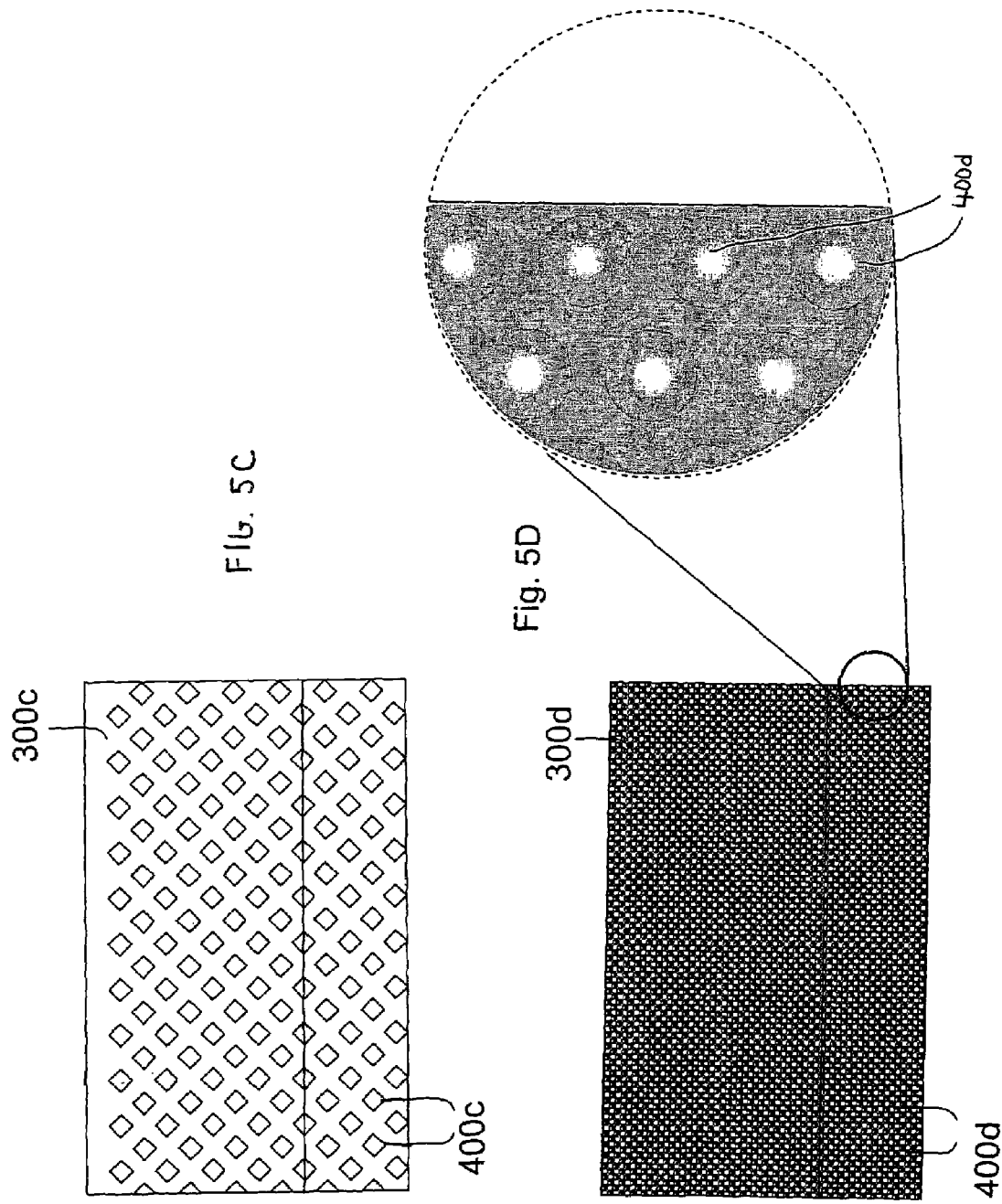

MOISTURE DIVERTING INSULATED SIDING PANEL

CROSS-REFERENCE TO RELATED APPLICATION

This application is a continuation-in-part of commonly assigned U.S. patent application Ser. No. 10/955,405 to Rick James Morse, Robert D. Shaw and Gregory F. Jacobs, entitled "Foam Backed Fiber Cement" filed Sep. 30, 2004 now abandoned, the entirety of which is hereby incorporated by reference herein.

FIELD OF THE INVENTION

The present invention relates to building materials generally, and more specifically to siding panel building materials.

BACKGROUND

Current insulated siding panels are designed to create a thermal barrier layer behind a thin vinyl siding layer. The lower butt sections of these vinyl siding layers are generally designed with weep holes to allow moisture trapped behind the siding to escape or weep out. This moisture can come from wind blown rain, condensation or other source. An example of one prior art insulated siding panel system is provided in U.S. Pat. No. 6,029,415 to Culpepper et al. (the "'415 Patent").

The advent of the insulation layer attached to the back of the siding creates a barrier which significantly limits the ability of the siding veneer to successfully weep this moisture away. Moisture can become trapped between the insulation layer and the siding panel and between the building wall and the insulation layer. The trapped moisture can cause significant damage to wall systems and building structures as well as significantly reduce the effectiveness of the insulation materials as they become saturated.

There remains a need for an improved siding system that better allows trapped moisture to escape. Therefore, an improved siding panel product and system are desired.

SUMMARY OF THE INVENTION

A siding panel product is provided comprising a first polymeric siding panel having a butt end and a top end, a front surface comprising a plurality of front faces defined between the top and butt ends and separated by at least one shoulder surface to define a stepped, or other, contour, and a rear surface. An insulation backing is coupled to the rear surface of the siding panel. The insulation backing comprises at least first and second insulation layers, coating panels or boards (hereinafter collectively referred to as "members")coupled to the rear surface of said siding panel. The first insulation member has a bottom edge thereof located proximate to the stepped, or other, contour and the second insulation member has a top edge thereof located proximate to the stepped, or other, contour.

Use of an insulation backing that comprises more than one insulation member helps to reduce scrap waste and improve handling and ease of assembly, all without reducing thermal and acoustic insulation performance.

In another embodiment of a siding panel product, the siding panel product includes one or more insulation members coupled to the rear surface of the siding panel where the one or more insulation members includes a plurality of spacing elements on at least one of the major surfaces thereof forming at least one channel. Depending on the orientation of the spacing elements, the insulated siding product can provide for a better adhesive connection between the insulation backing and the siding panel, and/or provide for improved or enhanced water drainage. Improved drainage can provide a diminished probability of occurrence of mold, mildew and/or rot formation behind a siding panel product. In some embodiments, the siding product includes an improved locking means that provides for an easier installation of the siding product, thereby providing both cost and manpower savings.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIG. 4 is a profile view of an embodiment of a stackable siding panel product;

FIG. 4A is a profile view of two interlocked and installed siding panel products of FIG. 4;

FIGS. 5A-5D are partial front plan views of alternative embodiments of the insulation backing shown in FIG. 5.

DETAILED DESCRIPTION

Figure 1:
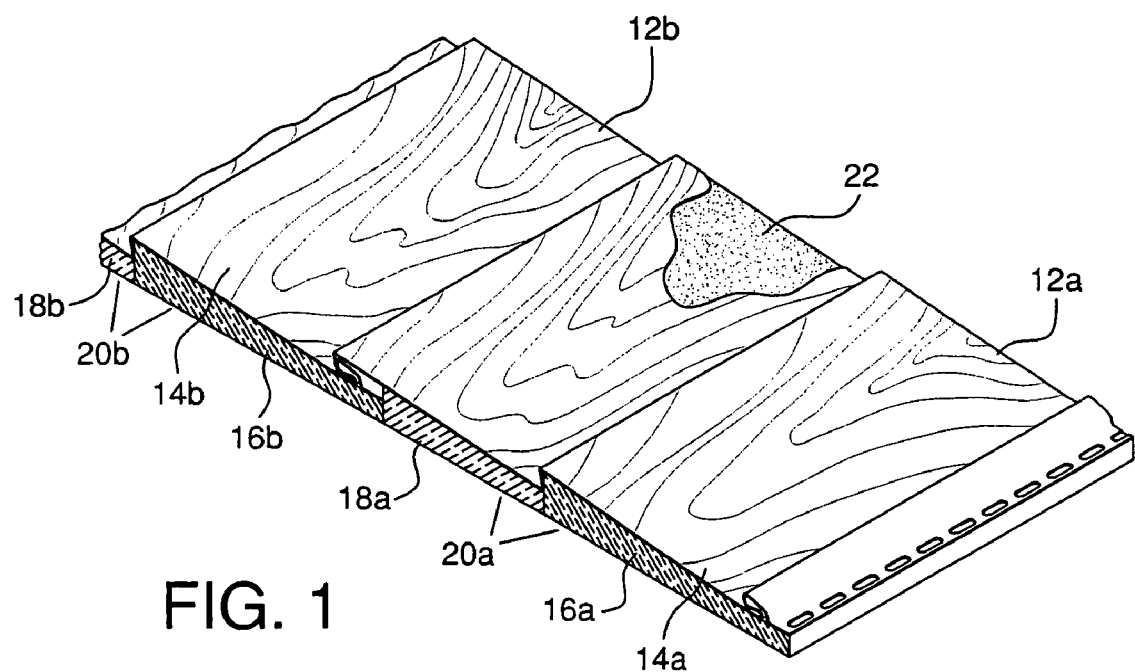
FIG. 1 is a partial perspective view of an embodiment of a siding panel product having a multi-component insulation backing.

Provided herein is an improved insulation product comprising a thin walled polymeric siding panel and an insulation backing coupled thereto. FIG. 1 is a partial perspective view showing two coupled insulation products 12a, 12b according to a first embodiment. As can be seen from FIG. 1 and as described in more detail in connection with FIGS. 2 and 2A, each insulation product 12a, 12b includes a respective siding panel 14a, 14b coupled, in a preferred embodiment, by an adhesive 22 to respective insulation backing 20a, 20b. The panels can be coupled to insulation members, such as layers, panels, boards or coatings (hereinafter collectively referred to as "members"), for example. In the embodiment shown in FIG. 1, each insulation backing 20a, 20b comprises a plurality of insulation members 16a, 18a and 16b, 18b, respectively, which are described in more detail below in connection with FIGS. 2 and 2A.

Figure 2B:
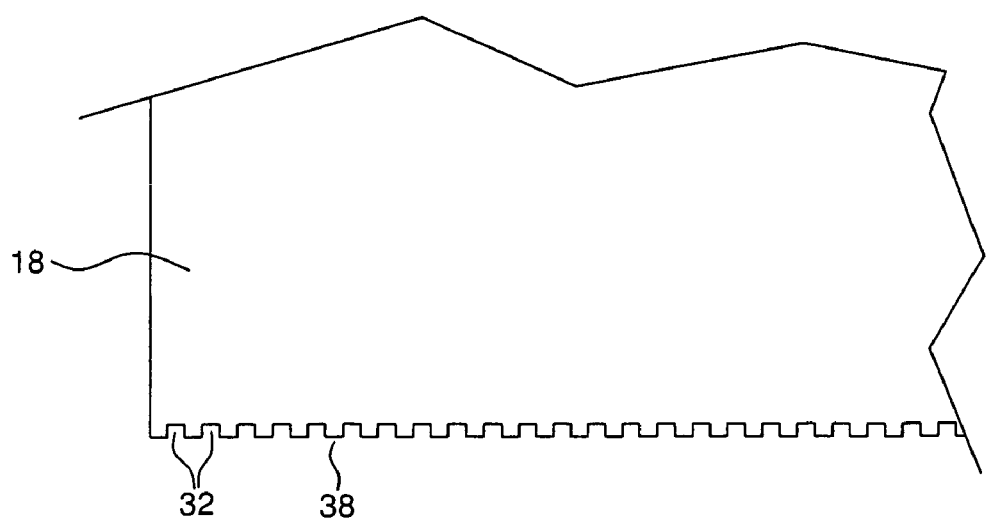
FIG. 2B is a partial front plan view of a portion of the insulation backing of the siding panel product of FIG. 1 according to one embodiment.
Figure 2:
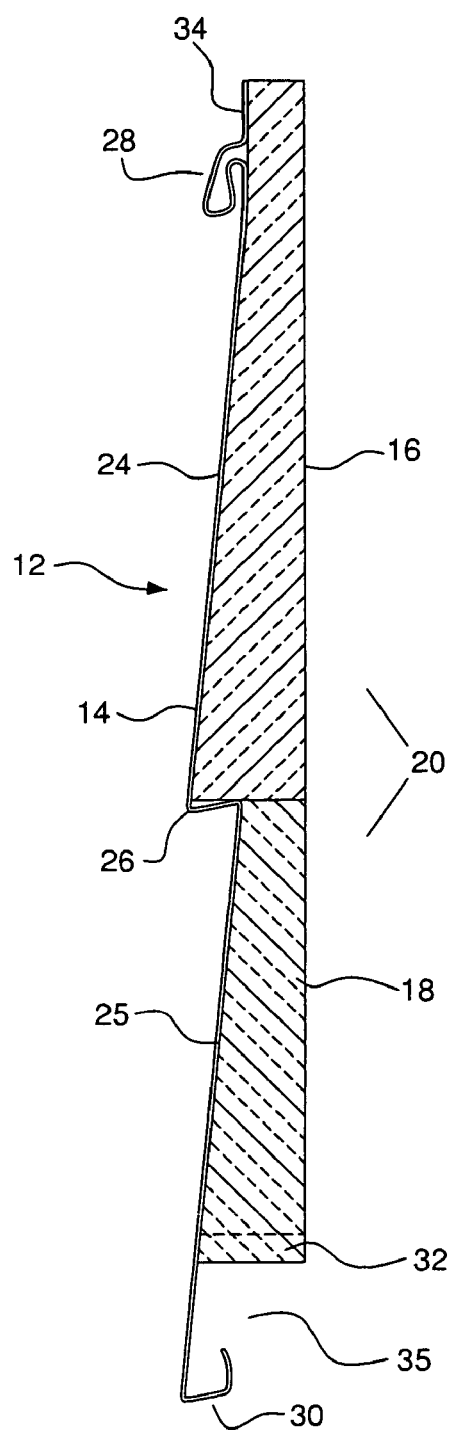
FIG. 2 is a profile view of the siding panel product of FIG. 1.

FIG. 2 is a profile view of an individual siding panel product 12 shown in FIG. 1. As noted, the siding panel product 12 includes siding panel 14 and insulation backing 20 coupled thereto. In a preferred embodiment, the insulation backing 20 is coupled to a rear surface of siding panel 14 using an adhesive, such as an adhesive described in the '415 Patent, which is incorporated by reference herein in its entirety. Other suitable adhesives includes, but are not limited to, UV curable adhesives and hot melt adhesives, such as polyamines and urethanes, glue, thermosetting or thermoplastic adhesives, pressure sensitive adhesives or solvent-based adhesives. Other suitable adhesives include, but are not limited to Super77 multiple adhesive and high-strength 90 spray adhesive by Minnesota Mining and Manufacturing Co. (3M), St. Paul, Minn. Alternatively, the insulation backing 20 can be sprayed onto the rear facing surface of the siding panel 14, such as in the form of a foamed insulation.

The insulation backing 20 is preferably coupled to the panel 14 during manufacturing, i.e., before distribution of the siding product for installation in the field, but the product 12 may also be assembled in the field. The adhesive may be applied to substantially coat the rear major surface of the siding panel 14 and front major surface of the insulation backing 20, or in patterns such as stripes, blocks or the like. The adhesive application may be to one or both surfaces prior to or during assembly.

The siding panel 14 is preferably polymeric, and most preferably formed from polyvinylchloride (PVC) or polypropylene (PP). In one embodiment, the siding panel 14 includes a plurality of front faces, or simulated board or shake members (optionally having a wood grain pattern molded or embossed thereon) defined between the top and butt ends of the siding panel 14. In the embodiment shown in FIG. 2, the siding panel 14 comprises an upper front face 24 and lower front face 25. The front faces 24, 25 may be substantially flat or planar, or may be arcuate in shape. Upper front face 24 and lower front face 25 meet at shoulder 26 that defines a stepped contour. Each face corresponds visually to a siding board, shingle or other patterned course.

The siding panel 14 also includes locking means for interlocking the siding panel 14 with similar panels installed above and/or below the panel 14. In one embodiment, the locking means includes a male hook member 30 located at a butt end of the siding panel 14 and a corresponding female member 28 located proximate to a top end of the siding panel 14 and below the nailing hem 34, in one embodiment. Nailing hem 34 may have apertures formed therein as shown in FIG. 1 for easy placement of nails, screws or other fasteners. The connection between these members and members of other similar products is best seen in FIG. 2A described below.

In one embodiment, the insulation backing 20 comprises two or more vertical insulation members that together provide the insulation backing with a substantially planar rear major surface and a front major surface that substantially conforms to the profile of the siding panel 14, except as discussed below. In one embodiment, the members of the insulation backing comprise a foam. The foam may be any of a variety of porous or non-porous closed cell foams. A closed cell foam will not soak up and hold water the way a sponge does. A preferred foam material, for example, can be a porous, closed-cell composite, formed by fusing together resilient, closed cell polymer beads only at their tangent points, providing a durable, non-absorptive composite that allows water to flow freely through the interstices throughout the material and to drain from the foam. The foam may be made of a thermosetting resin, such as polyurethane, or a thermoplastic resin, such as an olefin, like polypropylene or polyethylene, for example. Examples of suitable foams are "BREATHE-N-DRAIN™", FPP2.1, FPP3.0, and FPP5.5 porous, closed cell polypropylene composites made by Brock USA of Boulder Colo., or FPE2.7, FXPE2.1 and FXPE 3.2 porous closed cell polyethylene composites, also made by Brock USA. Alternatively, polystyrene and polyurethane foams could be used.

In the embodiment shown in FIG. 2, the insulation backing 20 comprises a first insulation member 16 coupled to the rear surface of the siding panel 14 with a substantial portion thereof above the stepped contour of the shoulder section 26 (i.e., the bottom edge of insulation member 16 is proximate to shoulder section 26) and a second insulation member 18 coupled to the rear surface of the siding panel 14 with a substantial portion thereof below the shoulder section 26 (i.e., a top edge of insulation member 18 is proximate to shoulder section 26). Second insulation member 18 has a top surface at a top edge thereof that is generally flush with the bottom edge of the first insulation member 16. The top edge of first insulation member 16 is preferably substantially flush and planar with the top edge of the nailing hem 34 of the siding panel 14. While first insulation member 16 has a width that is substantially equal to the width between the top edge of siding panel 14 and shoulder 26, the second insulation member 18 has a width that is smaller than the width between shoulder 26 and the butt end of the siding panel 14, i.e., siding product 12 has a portion 35 where the insulation backing 20 does not cover the rear surface of siding panel 14 for reasons described below.

Figure 2A:
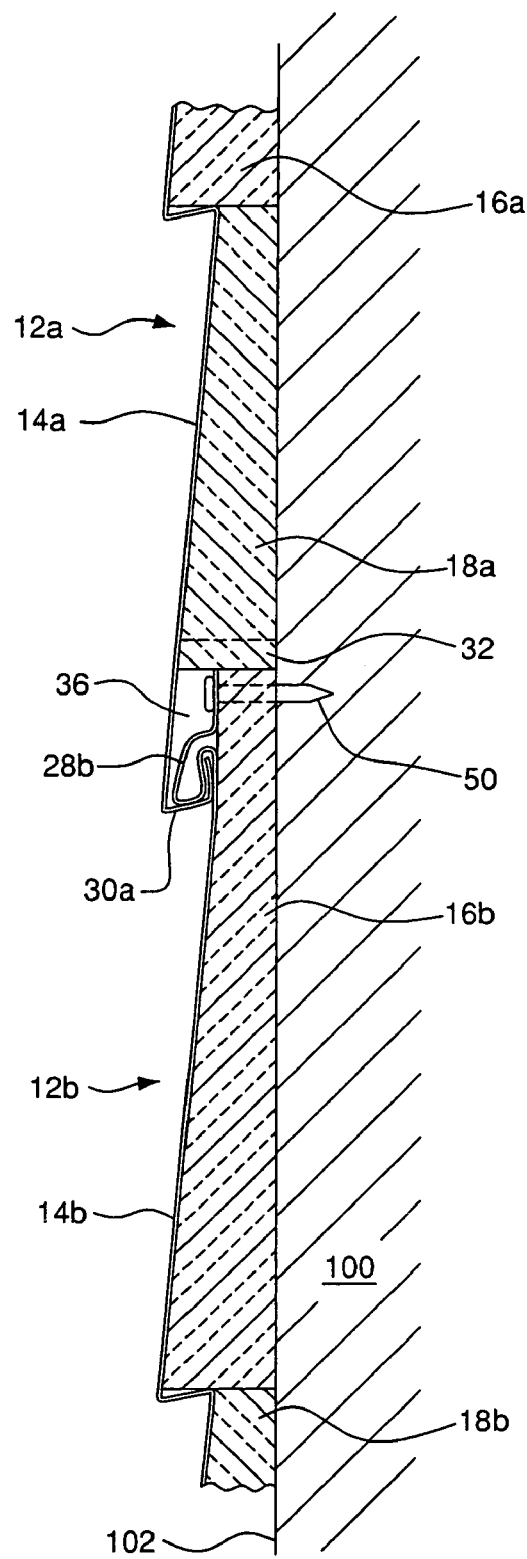
FIG. 2A is a profile view of two interlocked and installed siding panel products of FIG. 2.

FIG. 2A illustrates, in partial, two siding panel products 12a, 12b coupled together by interlocking members 28b and 30a. Siding panel product 12b is shown coupled to the exterior surface 102 of structure 100 with a series of fasteners 50 (one of which is shown). The insulation backing 20 substantially fills the space between the siding panel 14 and the exterior surface 102 of the structure 100 and forms a substantially continuous insulation surface against exterior surface 102. As one of ordinary skill will understand, fastener 50 may comprise nails, screws, staples, adhesives, or other fastening means. Portion 35 (described in connection with FIG. 2) is sized so that when panel products 12a, 12b are coupled together, second insulation member 18a of siding product 12a abuts the top edge of first insulation member 16b of siding product 12b to form a substantially continuous insulation layer between the siding panels 14a, 14b and surface 102.

By forming the insulation backing in two or more vertical sections, scrap waste is reduced in comparison to conventional one-piece insulation backing. Conventional foam backed siding products have foam sections that often are cut from large cubes or billets. Because the foam is cut to match the siding profiles, there are large amounts of scrap produced when the parts are cut. These one-piece foam sections are also difficult to handle and are very fragile in thinner areas, such as at the shoulder region, leading to possible fractures that can cause problems in coupling the foam backing to the siding panel and durability concerns. Use of the insulation backing 20, which comprises more than one insulation member, helps to reduce scrap waste and improve handling, and ease of assembly, all without reducing thermal and acoustic insulation performance.

Figure 2C:
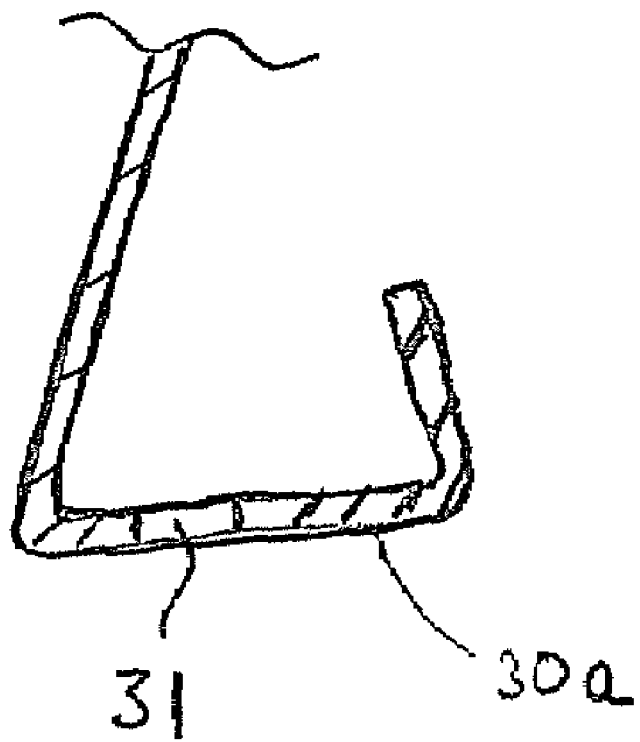
FIG. 2C is a partial cross-sectional profile view showing the male end of the locking means of the siding panel of the siding panel product of FIG. 2.

In one embodiment, best shown in the partial front plan view of insulation member 18 of FIG. 2B, the bottom edge 38 of the insulation member 18 comprises one or more channels 32 formed therein from the front to rear surfaces of the insulation member 18. When a insulation member 18a is installed over a insulation member 16b, as shown in FIG. 2A, the channels 32 allow water to migrate from behind the insulation backing 20, i.e., proximate to the exterior surface 102 of structure 100, through channels 32, and to open weep area 36 between the upper end of siding panel product 12b and butt end of siding panel product 12a. Although not shown in FIG. 2A but as should be familiar to those in the art, the butt end of siding panel product 12a preferably includes one or more weep holes that allow the moisture to weep from the installed siding panel product. FIG. 2C is a partial cross-sectional profile view showing the male portion 30a of the locking means of the siding panel 12a having a weep hole 31 formed therethrough.

Figure 5:
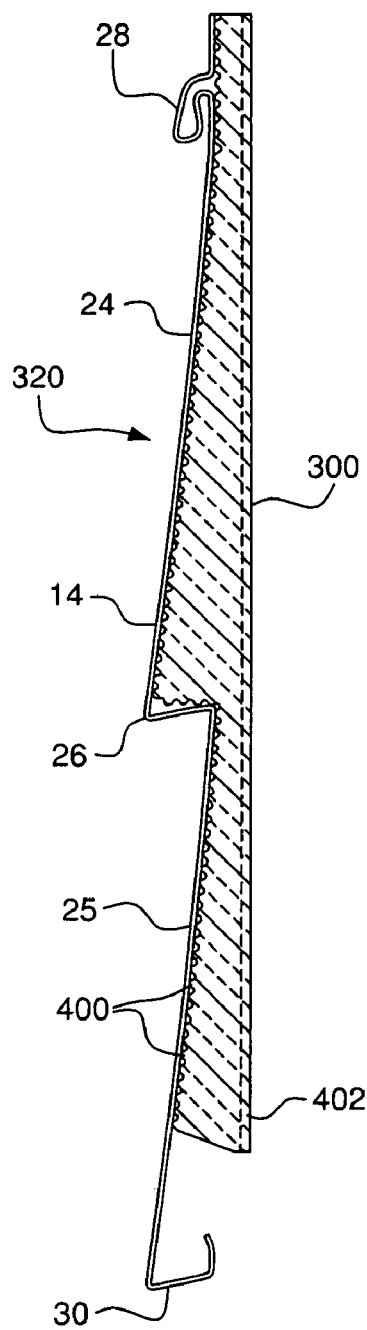
FIG. 5 is a profile view of an embodiment of a siding panel product having an insulation backing having a non-planar major surface.

Although the insulation backing 20 of FIG. 2A is shown as comprising two insulation sections with horizontal abutting surfaces at the bottom of section 16a and top of section 18a and at the top of section 16b and bottom of section 18a (FIG. 2A), other configurations are also contemplated. For example, the abutting surfaces could be at a matching angle with respect to the wall 100, preferably with the front edges (i.e., proximate to the front surface of backing 20) lower than the back edges (i.e., proximate to the rear surface of backing 20 and wall 100). In some embodiments, this configuration may help with moisture diversion, such as when channels 32 are formed at the bottom of sections 16 or 18 and/or at the top of sections 16 or 18, along with the formation of weep areas at weep area 36 and/or shoulder 26 and/or in connection with channels or protrusions formed in the front surface of the insulation backing as shown in FIGS. 5-5D.

Figure 3:
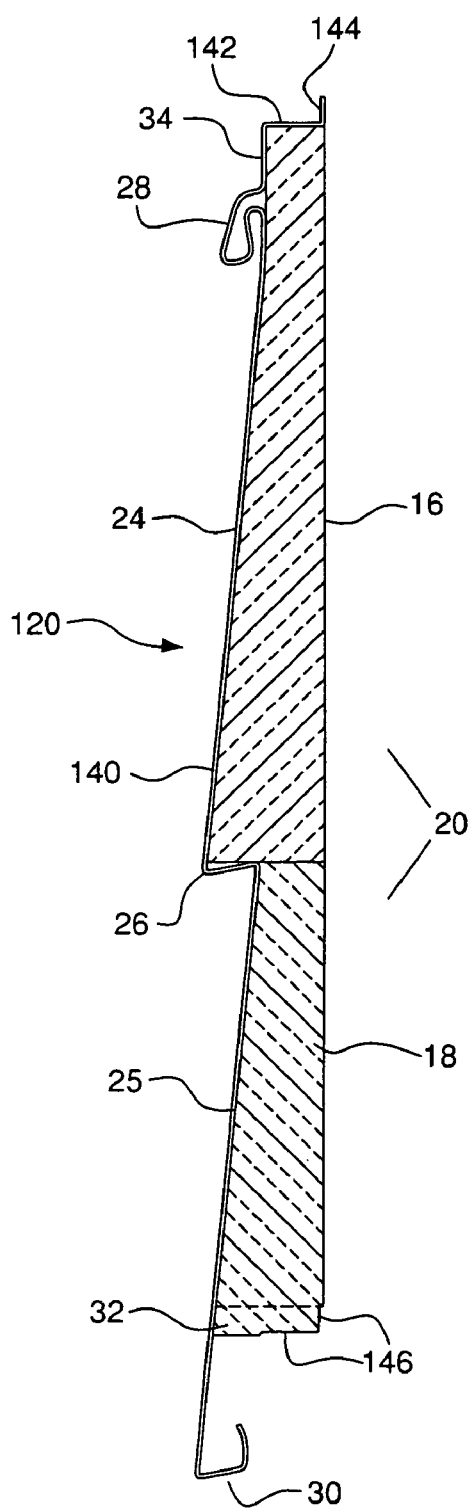
FIG. 3 is a profile view of an embodiment of a siding panel product having a moisture diverting means.
Figure 3A:
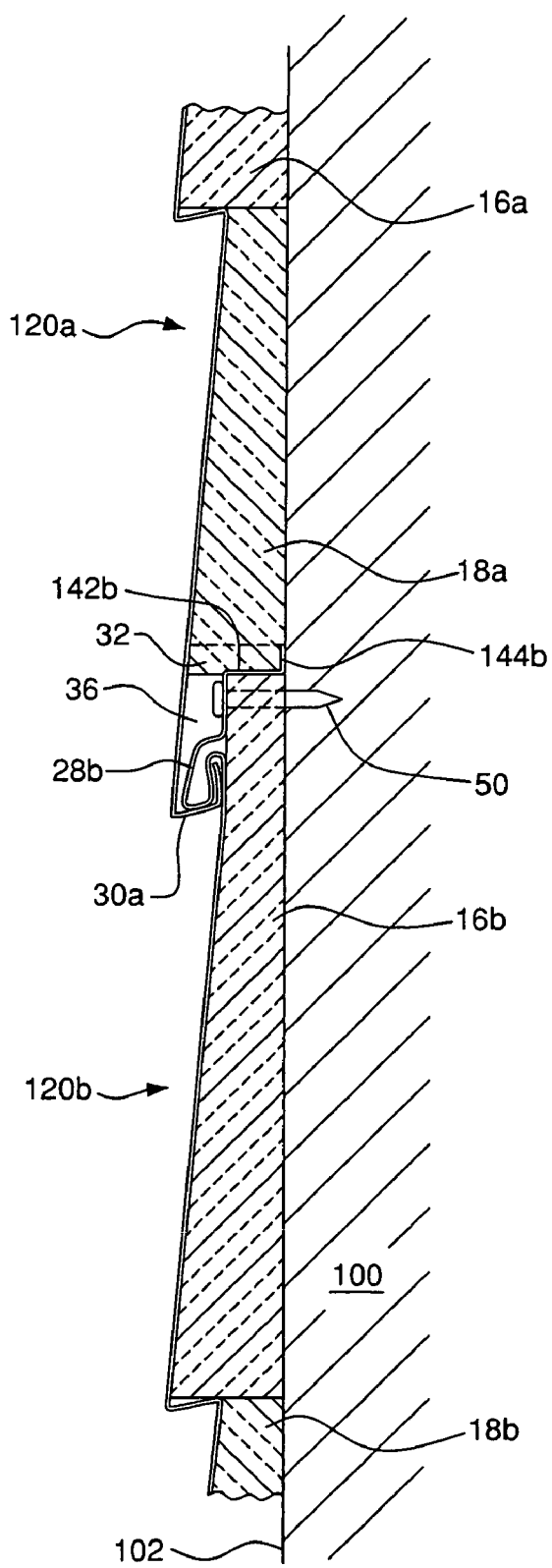
FIG. 3A is a profile view of two interlocked and installed siding panel products of FIG. 3.

With reference to FIG. 3, another embodiment of a siding panel product 120 is illustrated. Features similar to those shown in the siding panel product 12 of FIG. 2 share the same reference numbers. Siding panel 140 is identical to siding panel 14 except that siding panel 140 includes a water diverting means comprising, in the illustrated embodiment, return leg 142 disposed over the upper surface of insulation member 16 and a second leg section 144 extending upward from the return leg 142 and positioned to sit against the exterior surface 102 of structure 100 when the siding panel product 120 is installed as shown in FIG. 3A. Siding panel 140 may be coupled to a one-piece insulation backing of the prior art, but is more preferably coupled to a multi-piece insulation backing 20 as shown in FIG. 3 and described in detail above in connection with FIGS. 2 and 2A.

With reference to FIG. 3A, the return leg 142b and upwardly facing leg 144b help to prevent or at least reduce moisture that gravitates down exterior surface 102 behind insulation section 18a installed above insulation section 16b from continuing behind insulation backing section 16b. The leg 144b and return leg 142b also help to direct the moisture toward weep area 36, particularly when used in connection with channels 32 in insulation section 18a described above. The improved drainage path so formed can help to keep the structure 100 drier, when compared to conventional designs, improve the insulation value of the foam polymer in insulation backing 20 and reduce potential issues associated with moisture infiltrating the wall of structure 100 where it can do significant damage through rotting, molding or mildew. In one embodiment, the vertical portion of the return leg 144b could be sized to be used as a nailing flange, rather than nailing through the foam 16b as shown in FIG. 3A.

In one embodiment, a recessed region 146 of second insulation member 18 is shaved, cut or otherwise formed into the insulation member 18 to match and provide a tight fit with the return leg 142 and upwardly oriented leg 144, as shown in FIG. 3A. Although the moisture diverting means is shown as a generally "L" shaped structure in the embodiment of FIG. 3, other shapes may also be used. For example, return portion 142 could be angled or curved. Appropriate mating recesses for these embodiments could also be formed at the bottom edge of insulation backing section 18, like recessed portion 146 only corresponding to the angled or curved shape of modified return leg.

FIG. 4 is a side profile view of an embodiment of an insulated siding panel product 220 having an alternative means for interlocking the siding panel with similar siding panel products disposed above and/or below the siding panel product 220. In contrast to the locking means shown in FIGS. 2 and 3, where the male portion 30 of the locking means is upwardly oriented and the female portion 28 is downwardly oriented, the locking means of this embodiment includes an upwardly facing female portion 280 proximate to nailing hem 340 and a downwardly depending male member 300. As shown in the installation assembly of FIG. 4A, the siding panel products 220a, 220b can be interlocked using a simplified stacking process. A first siding product 220b is aligned along, and secured to, the wall 100 using fasteners 50 disposed through nailing hem 340. The second siding product 220a is then coupled to the first siding product 220b by positioning the product 220a above the installed product 220b, with male member 300a aligned over female member 280b, and moving the product 220a downward to guide and dispose the male member 300a thereof into the female member 280b of the first siding product 220b. The siding product 220a is then fastened to the wall 100 while it is supported by already fastened product 220b.

Siding products 220, which are configured for a downward coupling, are easier to install than those using conventional locking means of the prior art, which require panels to be lifted upwards to make the connection between male member 30 and female member 28 and which require a second installer to hold the top panel in place while the first installer provides the fasteners. With siding products 220, however, because the male member 300a is oriented downward and comes to rest in the upwardly oriented female member 280b, the fixed panel 200b supports the panel 200a while fasteners are applied to secure panel product 200a to structure 100, thereby reducing or eliminating the need for another installer to support the second panel product 200a during the fastening step.

As shown in FIG. 4, siding panel product 220 includes a single piece (at least width wise) insulation backing 200. While multiple section insulation backings can certainly be used as described above, the design of siding panel product 220, and specifically of siding panel 240, is particularly suited for use with single piece insulation backings that are at least partially mechanically supported within the profile of siding panel 240. This mechanical, fitted connection between the siding panel profile 240 and insulation backing 200 allows for an elimination of or reduction in the adhesive used for coupling the siding panel 240 to the insulation backing 200. Optionally, one or more channels 232, preferably diagonally oriented, could be provided through the foam backing to facilitate moisture transport from behind the backing to a weep area in front of and/or below the backing.

Figure 5A:
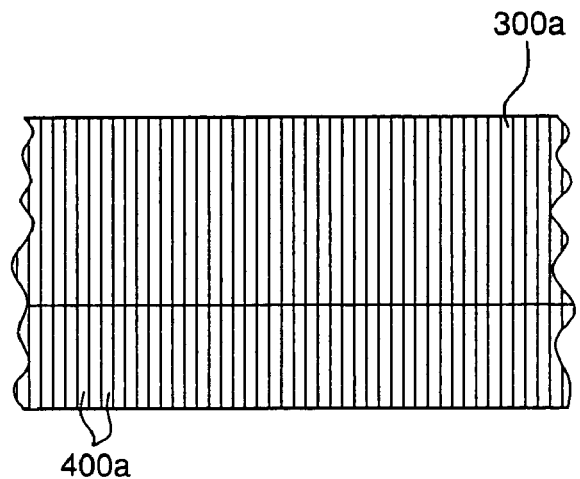
Figure 5B:
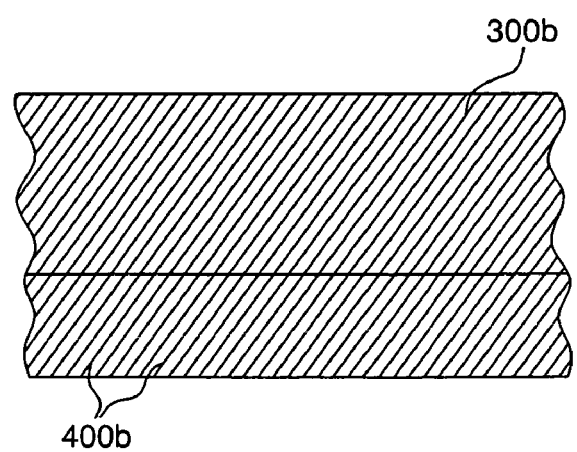

FIGS. 5-5B illustrate an alternative embodiment of a siding panel product 320 having an insulation backing having channels formed in at least one major surface thereof. Siding panel product 320 include a siding panel 14 as shown and described in connection with FIG. 2, although other siding panels, such as those shown in FIGS. 3 and 4 may also be used. In the embodiment shown in FIG. 5, siding panel product 320 includes an insulation backing 300 having channels or openings formed into at least one of its front or back major surfaces. In the embodiment shown in FIG. 5, the insulation backing 300 includes a plurality of horizontal channels formed in its front major surface, i.e., the major surface that faces the rear surface of the siding panel 14. The channels can be formed by a plurality of horizontal holes, humps, ribs, grooves or protrusions 400, or other spacing elements, that create an irregular surface for increasing the surface area for bonding to the rear surface of the siding panel 14, thereby providing an improved bond between the insulation backing 300 and the siding panel 14. The humps, ribs, grooves or protrusions preferably, but not necessarily, substantially cover the entire front major surface of the insulation backing 300.

In alternative embodiments of the insulation backing shown in the front plan views of FIGS. 5A and 5B, the channels are oriented at an angle relative to horizontal. As shown in the embodiment of FIG. 5A, insulation backing 300a may include a plurality of substantially vertical channel forming protrusions 400a, or other spacing elements, formed in the front major surface of the insulation backing 300a. In the embodiment shown in FIG. 5B, the insulation backing 300b includes a plurality of channel forming protrusions 400b oriented diagonally, i.e., at an oblique angle to the horizontal. In these embodiments, where the channels are perpendicular or at an oblique angle to the horizontal, the channels help facilitate the movement of water towards weep channels formed in the butt end of the siding panel 14. To that end, the channels are preferably at an angle of between about 45-90° to the horizontal. In these embodiments where it is desired to use the channels as weep channels in the front major surface of the insulation backing, the adhesive is preferably not applied to the entire front major surface of the insulation backing, so as to avoid clogging or otherwise blocking the channels. Rather, the adhesive is preferably applied in spaced vertical strips. Although the adhesive does not cover substantially the entire front major surface of the insulation backing in these embodiments, the adhesive should create an improved localized bond between the insulation backing and the siding panel due to the localized increased surface area, as described above with channel forming protrusions 400. In alternative embodiments shown in FIGS. 5C and 5D, the channel forming protrusions are discontinuous, or put another way, each diagonal, vertical and/or horizontal protrusion line is formed from a plurality of discrete protrusions. As shown with the backings 300c and 300d of FIGS. 5C and 5D, respectively, these protrusions 400c, 400d can take on any number of shapes, such as squares (protrusions 400c), rounded bumps (protrusions 400d) or other shapes. These configurations form criss-crossing channels to provide multiple drainage channels and paths. Adhesive could be applied in a measured amount to provide for adhesion at substantially only the peaks or outer most surface of these protrusions, leaving the channels free for drainage.

In one embodiment, the channels are formed on both the front and rear major surfaces of the insulation backing. FIG. 5 shows in shadow the channels 402 formed on the rear major surface of insulation backing 300. Although not shown, channels may also be formed along the sides of the insulation backing to modulate drainage of water from sides of the product.

The channels in the insulation backing can be formed to any width or depth. The spacing of the channels or protrusions may be any distance, and may be varied within a single section of insulation backing. The ratio between the portion of the insulation backing covered by the protrusions and any non-protrusioned portion (which may be otherwise flat, curved or textured) may be varied. The channels also need not be straight, but can be wavy, for example. Also, the channels can take on any cross-sectional shape, such as a semi-circular, square, rectangular, V-shaped, semi-elliptical. In one exemplary embodiment, the protrusions are spaced between about 1.0 to about 10 mm, preferably about 2.0 to about 8 mm, and at a depth of between about 0.5 to about 5 mm, preferably about 1.0 to about 3.0 mm. The protrusions may be formed directly in the profile during formation of the insulation backing 300, by cutting backing 300, by pressing or embossing the protrusions in the surfaces of backing 300, or by burning channels in the backing 300, for example.

As described above, the channels may be formed by holes, humps, ribs, grooves, or protrusions formed on one or more major surfaces of the insulation backing. Other examples of spacing elements that may be used to provide a non-planar surface for diverting moisture towards weep area include bosses, spacers, or adhesive build up areas.

A method of using an exemplary product comprises: providing a first siding panel product as described herein and mounting the first siding panel product to a building by a variety of fasteners, including, but not limited to, nails, staples, screws, and the like or, alternatively adhesive means such as, for example, glues or tapes. Then, a second siding panel product is provided, coupled to the first siding panel and mounted to the building.

Some embodiments of insulated siding products described herein provide for improved or enhanced water drainage. Improved drainage can provide a diminished probability of occurrence of mold, mildew and/or rot formation behind a siding panel product. In other embodiments, the siding product includes an improved locking means that provides for an easier installation of the siding product, thereby providing both cost and manpower savings.

Figure 6A:
FIGS. 6A and 6B illustrate siding panels having alternative faces.
Figure 6B:

Although the siding panels shown in FIGS. 2-5 have faces consistent with traditional clapboard siding panel faces, other siding panel profiles can certainly be employed. For example, in certain embodiments, the siding panels may be configured as a so-called "Dutchlap" siding panel having more planar faces, as shown in FIG. 6B, or even as a so-called "single beaded" siding panel having a single major panel face, in certain embodiments.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A siding panel product comprising:
    a first polymeric siding panel comprising a butt end and a top end, a front surface comprising a plurality of front faces defined between said top and butt ends and separated by at least one shoulder surface to define a stepped contour, and a rear surface; and
    an insulation backing system coupled to the rear surface of the siding panel, said insulation backing system comprising at least first and second discrete insulation members coupled to the rear surface of said siding panel, said first discrete insulation member disposed above said second discrete insulation member, said first discrete insulation member having a bottom surface thereof seated in part on said shoulder surface and extending laterally to be seated in part on a top surface of said second discrete insulation member, wherein the first and second discrete insulation members have rear surfaces that are coplanar with one another.

2. The siding panel product of claim 1, wherein said first polymeric siding panel comprises a locking means for interlocking said first polymeric siding panel with siding panels disposed above and below said first polymeric siding panel, and a nailing hem positioned proximate to a top end thereof.

3. The siding panel product of claim 2,
wherein said locking means comprises a male portion disposed at the butt end and a female portion disposed below said nailing hem at said top end; and
wherein said first insulation member has an uppermost top surface thereof substantially planar with an uppermost top surface of said first polymeric siding panel.

4. The siding panel product of claim 3, wherein said second discrete insulation member is sized such that a bottom surface thereof abuts the uppermost top surface of a first discrete insulation member of a second, similar siding panel product interlocked with said male portion of said first polymeric siding panel.

5. The siding panel product of claim 4, wherein a bottom end of said second discrete insulation member comprises a plurality of channels formed therethrough extending between front and rear faces of the second insulation member.

6. The siding panel product of claim 2, wherein said locking means comprises a downwardly depending male portion disposed at said butt end and an upwardly facing female portion disposed proximate to said top end to receive the downwardly depending male portion of a second similar siding panel product.

7. The siding panel product of claim 1, wherein said siding panel comprises moisture diverting means disposed at said top end over a top surface of said first discrete insulation member for directing moisture towards said front surface.

8. The siding panel product of claim 7, wherein said moisture diverting means comprises a return portion extending over a top end of said first discrete insulation member and a leg extending upwardly from said return portion and disposed to lie against an exterior surface of a structure when said siding panel product is installed against said exterior surface, whereby said return portion and leg help divert moisture from above said siding panel product to away from said exterior surface.

9. The siding panel product of claim 1, wherein a bottom end of said second discrete insulation member comprises a plurality of channels formed therethrough extending between front and rear faces of the second discrete insulation member.

10. The siding panel product of claim 1, wherein said insulation members have front major surfaces, the front major surface of each insulation member including a plurality of spacing elements, wherein the front major surfaces of the insulation members are coupled to the rear surface of the siding panel by an adhesive bond.

11. A siding panel product comprising:
a first siding panel comprising a butt end and a top end, a front surface, and a rear surface, wherein the first siding panel comprises a locking means for interlocking said first polymeric siding panel with siding panels disposed above and below said first polymeric siding panel, and wherein said locking means comprises a male portion disposed at the butt end and a female portion disposed at said top end; and
an insulation backing system comprising a pair of discrete insulation members having front major surfaces coupled to the rear surface of the siding panel, a first one of said pair of discrete insulation members disposed above a second one of said discrete insulation members, said pair of discrete insulation members having rear major surfaces that are coplanar with one another, said pair of discrete insulation members comprising a plurality of spacing elements on at least one of their front and rear major surfaces thereof forming at least one channel,
wherein said at least one channel is oriented to direct moisture from behind said first siding panel toward said butt end,
wherein said first siding panel comprises one or more weep holes or openings formed at the male portion of the locking means of said butt end thereof.

12. The siding panel product of claim 11,
wherein when said siding panel is installed on an exterior surface of a structure, said exterior surface defines a plane having a horizontal and vertical axes, said butt end being parallel to said horizontal axis after installation, said at least one channel being oriented at an angle either oblique to or perpendicular to said horizontal axis.

13. The siding panel product of claim 12, wherein said angle is at or between about 45-90° to said horizontal axis.

14. The siding panel product of claim 11,
wherein said front surface comprises a plurality of front faces defined between said top and butt ends and separated by at least one shoulder surface to define a stepped contour; and
wherein said insulation backing comprises front and rear major surfaces, said front major surface coupled to the rear surface of said siding panel, said front major surface shaped to substantially conform to the profile of said siding panel, including corresponding front faces and stepped contour,
wherein at least said front major surface comprises said plurality of spacing elements, said spacing elements formed in at least said corresponding front faces of said front major surface of said insulation backing.

15. The siding panel product of claim 14, wherein said spacing elements comprise channel-forming humps, ribs, grooves, protrusions or a combination thereof.

16. The siding panel product of claim 15, wherein said one or more insulation members are coupled to the rear surface of said siding panel with an adhesive.

17. The siding panel product of claim 10, wherein said insulation backing comprises front and rear major surfaces, said front major surface coupled to the rear surface of said siding panel, at least said rear major surface comprising said plurality of spacing elements.

18. The siding panel product of claim 17, wherein said spacing elements comprise channel-forming humps, ribs, grooves, protrusions or a combination thereof forming a plurality of said at least one channel.

19. The siding panel product of claim 11, wherein said insulation backing is at least in part mechanically supported within the profile of the first siding panel.

20. The siding panel product of claim 11, wherein said spacing elements comprise channel-forming humps, ribs, grooves, protrusions or a combination thereof forming a plurality of said at least one channel.

21. The siding panel product of claim 11,
wherein said spacing elements are formed on a front major surface of the one or more insulation members, wherein said spacing elements comprise channel-forming humps, ribs, grooves, protrusions or a combination thereof, and
wherein said insulation backing is coupled to the rear surface of the siding panel by an adhesive.

22. The siding panel product of claim 21, wherein said adhesive is applied in a pattern so as to allow said at least one channel to direct moisture from behind said first siding panel toward said butt end.

23. The siding panel product of claim 11, wherein the first one of the pair discrete insulation members has a bottom surface thereof seated in part on the shoulder surface and extending laterally to be seated in part on a top surface of said second one of the pair of discrete insulation members.

24. A siding panel product comprising:
a first polymeric siding panel comprising a butt end and a top end, a front surface comprising a plurality of front faces defined between said top and butt ends and separated by at least one shoulder surface to define a stepped contour, and a rear surface; and
an insulation backing system coupled at least in part by an adhesive to the rear surface of the siding panel, said insulation backing system comprising at least first and second discrete insulation members coupled to the rear surface of said siding panel, said first discrete insulation member disposed above said second discrete insulation member, said first discrete insulation member having a bottom surface thereof seated in part on said shoulder surface and extending laterally to be seated in part on a top surface of said second discrete insulation member, said discrete insulation members cooperating to form a substantially continuous front major surface in contact with the rear surface of said siding panel for said insulation backing, said discrete insulation members having rear major surfaces coplanar with one another cooperating to form a planar rear major surface for said insulation backing system,
said insulation backing system comprising a plurality of channel-forming spacing elements disposed on at least one of the front major surface, the rear major surface, and a bottom end of said insulation backing system to form a plurality of channels.

* * * * *

UNITED STATES PATENT AND TRADEMARK OFFICE
CERTIFICATE OF CORRECTION

| | |
|---|---|
| PATENT NO. | : 7,712,276 B2 |
| APPLICATION NO. | : 11/093465 |
| DATED | : May 11, 2010 |
| INVENTOR(S) | : Thomas C. Gilbert et al. |

Page 1 of 1

It is certified that error appears in the above-identified patent and that said Letters Patent is hereby corrected as shown below:

Column 10, line 37, delete "10" and insert therefor --11--; and

Column 10, line 66, insert --of-- after the word "pair".

Signed and Sealed this

Twenty-fourth Day of August, 2010

David J. Kappos
*Director of the United States Patent and Trademark Office*